United States Patent [19]
Berg et al.

[11] 3,947,077
[45] Mar. 30, 1976

[54] SEALED BALL AND SOCKET CONNECTION

[75] Inventors: Lawrance F. Berg, Lockport; Peter F. M. Prillinger, Decatur, both of Ill.

[73] Assignee: Caterpillar Tractor Co., Peoria, Ill.

[22] Filed: Sept. 23, 1974

[21] Appl. No.: 508,501

Related U.S. Application Data
[62] Division of Ser. No. 352,502, April 18, 1973, Pat. No. 3,873,166.

[52] U.S. Cl............. 308/187.1; 277/181; 277/212 C
[51] Int. Cl.².......................................... F16C 1/24
[58] Field of Search............ 308/187.1, 187.2, 36.1; 277/17-21, 59, 212 C, 181-186, 189

[56] References Cited
UNITED STATES PATENTS

| | | | |
|---|---|---|---|
| 3,814,446 | 6/1974 | Derman | 308/187.1 |
| 3,848,938 | 11/1974 | Stella et al. | 308/187.1 |

*Primary Examiner*—M. H. Wood, Jr.
*Assistant Examiner*—Richard A. Bertsch
*Attorney, Agent, or Firm*—Phillips, Moore, Weissenberger Lempio & Strabala

[57] ABSTRACT

An outer bearing race is mounted in a bore defined in a support member and an inner bearing race is universally mounted in the outer race to form a ball and socket connection therebetween. An annular retainer is secured in the bore on each side of the outer race to retain an annular lip seal therebetween. A flexible lip of the seal extends radially inwardly into sealing contact with a convex spherical surface formed on the inner race.

2 Claims, 3 Drawing Figures

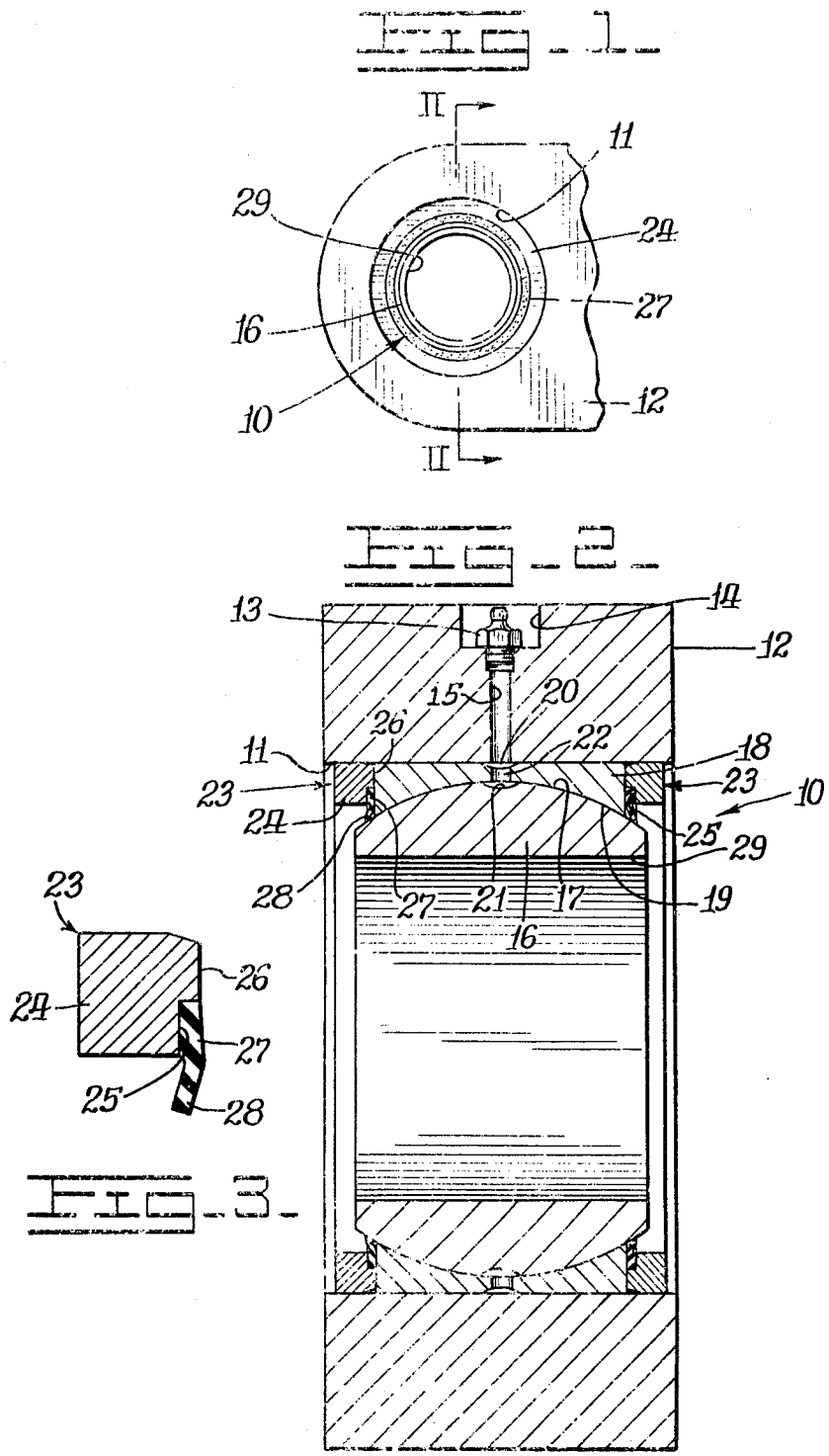

SEALED BALL AND SOCKET CONNECTION

CROSS REFERENCE TO RELATED APPLICATION

This application is a divisional of U.S. Ser. No. 352,502, filed on Apr. 18, 1973, as U.S. Pat. No. 3,873,166.

BACKGROUND OF THE INVENTION

Ball and socket connections, employing spherically-shaped self-aligning bearings, are commonly employed for pivotally mounting the ends of a hydraulic cylinder on an earthworking vehicle. Such vehicles are exposed to adverse environments which tend to wear the bearings excessively. The bearings are oftentimes "permanently" lubricated and sealed to aid in increasing the life expectancy thereof.

For example, various bearing materials such as oil-impregnated sintered metal and Teflon-coated phenolics may be employed in such bearing applications. Such materials are normally incapable of withstanding the high loads imposed thereon when used in heavy-duty earthworking applications. In addition, conventional ball and socket connections are generally difficult to assemble and disassemble for repair purposes. Examples of such connections are disclosed in U.S. Pat. Nos. 2,308,613; 2,711,352; 3,347,577; 3,506,315; 3,554,588; 3,588,201; and 3,680,924.

SUMMARY OF THIS INVENTION

An object of this invention is to overcome the above, briefly described problems by providing an economical and non-complex sealed ball and socket connection which is adapted for expeditious assembly and disassembly and long service life. The ball and socket connection comprises an inner race having a convex spherical surface formed thereon and an outer race, mounted in a bore of a support member, having a concave spherical surface universally mounted on the convex spherical surface of the inner race. A combined sealing and retaining means is disposed on each lateral side of the outer race and includes an annular retainer secured within the bore, an annular recess formed on an inboard side of the retainer and an annular lip seal secured in the recess between the outer race and the retainer. A flexible lip of the seal extends radially inwardly into sealing contact with the convex spherical surface of the inner race.

BRIEF DESCRIPTION OF THE DRAWINGS

Other objects of this invention will become apparent from the following description and accompanying drawings wherein:

FIG. 1 is a side elevational view of an end of a hydraulic cylinder having a sealed ball and socket connection of this invention mounted therein;

FIG. 2 is an enlarged sectional view of the ball and socket connection, taken in the direction of arrows II—II in FIG. 1; and FIG. 3 is an enlarged cross sectional view of a combined sealing and retaining means employed in the ball and socket connection.

DETAILED DESCRIPTION

FIG. 1 illustrates a sealed ball and socket connection 10 mounted in a bore 11 formed transversely through a support member 12. The support member may comprise the head or rod end of a hydraulic cylinder, for example, employed in an earthworking vehicle such as a hydraulic excavator. As shown in FIG. 2, lubrication means comprises a grease fitting 13 which is threadably mounted in a recess 14, formed on the support member to normally close a radial fill passage 15.

The ball and socket connection comprises an inner race 16 having a convex spherical surface 17 formed exteriorly thereon. An outer race 18 is slidably mounted in bore 11 and has a concave spherical surface 19 formed internally thereon to substantially conform to surface 17 to provide a self-aligning bearing contact therebetween. Fill passage 15 is adapted to communicate lubricant, such as grease or oil, to a first annular groove 20 formed on the outer periphery of the outer race and thence to a second annular groove 21 formed on the outer periphery of the inner race via a plurality of circumferentially spaced ports 22.

A combined sealing and retaining means 23 is disposed on each lateral side of the outer race to prevent axial displacement of the races, relative to support member 12, and to prevent loss and contamination of the sealed lubricant. Such means includes an annular retainer 24 of rectangular cross section press-fitted or otherwise suitably secured within bore 11 to have a flat inboard sidewall 26 thereof abut a respective flat outboard sidewall of the outer race. An annular recess 25 is formed on the retainer's inboard sidewall to extend radially inwardly towards the inner race.

An annular lip seal 27 of means 23 may be suitably disposed in the recess and bonded to the retainer by a suitable adhesive. As shown in FIG. 3, the inboard sidewall of the seal is substantially flush with inboard sidewall 26 of the retainer to compress the seal between the retainer and outer race 18 to aid in positive securance thereof in the ball and socket connection (FIG. 2). The lip seal comprises a flexible lip 28 which extends radially inwardly below the retainer and into sealing and wiping contact with convex spherical surface 17 of the inner race. The inner race has a bore 29 formed transversely therethrough, adapted to mount support member 12 on a pivot shaft or the like (not shown).

Upon installation of each retainer 24 and lip seal 27 into bore 11, it should be noted that flexible lips 28 of the seals will inherently flex outwardly under a predetermined preload to continuously maintain their sealing contact with surface 17. Thus, a continuous wiping action against such surface will function to dislodge foreign particles and material therefrom and will prevent the loss of lubricant therepast. The seals preferably comprise a polyurethane material or the like which exhibits a high resistance to tear and abrasion and further exhibits a high modulus of elasticity and elastic memory.

What is claimed is:

1. A combined sealing and retaining means adapted for use in a sealed ball and socket connection comprising
an annular rigid retainer having a generally rectangular cross section,
annular recess means of generally rectangular cross section formed on only one axial side and radially inner corner of said retainer to extend to a limited and substantially constant depth axially in said retainer and radially downwardly thereon and
an annular elastomeric lip seal constituting an upper portion secured in said recess means and substantially conforming to the shape thereof and a flexible lip extending radially downwardly from said upper portion and below said retainer.

2. The combined sealing and retaining means of claim 1 wherein an exposed side of said seal is substantially flush with respect to an adjacent sidewall of said retainer, said retainer having a generally rectangular cross section.

* * * * *